(12) United States Patent
Rennie et al.

(10) Patent No.: US 7,004,303 B2
(45) Date of Patent: Feb. 28, 2006

(54) METHOD AND APPARATUS FOR SINGULATING LUMBER

(75) Inventors: John L. Rennie, Lumby (CA); Cody A. Wikman, Vernon (CA)

(73) Assignee: Rennie Equipment Incorporated, Lumby British Columbia (CA)

( * ) Notice: Subject to any disclaimer, the term of this patent is extended or adjusted under 35 U.S.C. 154(b) by 0 days.

(21) Appl. No.: 10/313,168

(22) Filed: Dec. 6, 2002

(65) Prior Publication Data

US 2003/0183483 A1    Oct. 2, 2003

(30) Foreign Application Priority Data

Mar. 26, 2002  (CA)  .................................... 2378996

(51) Int. Cl.
  *B65G 47/04* (2006.01)
(52) U.S. Cl. ............... 198/476.1; 198/459.5; 198/463.5
(58) Field of Classification Search ............ 198/476.1, 198/459.5, 463.5
  See application file for complete search history.

(56) References Cited

U.S. PATENT DOCUMENTS

| | | | |
|---|---|---|---|
| 3,031,061 A | | 4/1962 | Rambo et al. |
| 3,147,842 A | | 9/1964 | Rambo |
| 3,420,353 A | | 1/1969 | Babunovic |
| 3,628,652 A | * | 12/1971 | Orstam ...................... 198/459.5 |
| 3,799,322 A | * | 3/1974 | Van Linder et al. ...... 198/463.5 |
| 3,989,135 A | * | 11/1976 | Pyykonen ................. 198/459.5 |
| 4,077,524 A | * | 3/1978 | Rysti ........................ 198/459.1 |
| 4,669,603 A | | 6/1987 | Haas, sen. et al. |
| 5,368,080 A | | 11/1994 | Hamel |
| 5,417,265 A | | 5/1995 | Davenport et al. |
| 5,813,512 A | | 9/1998 | Andersson et al. |
| 5,921,376 A | | 7/1999 | Michell et al. |
| 5,992,484 A | | 11/1999 | Jackson |
| 6,105,955 A | | 8/2000 | Rawlings et al. |
| 6,199,683 B1 | * | 3/2001 | Michell et al. ........... 198/476.1 |

FOREIGN PATENT DOCUMENTS

CA           2149948          11/1996

* cited by examiner

*Primary Examiner*—Douglas Hess
(74) *Attorney, Agent, or Firm*—Cook, Alex, McFarron Manzo, Cummings & Mehler, Ltd.

(57) ABSTRACT

An apparatus for spacing boards of lumber in transverse parallel contacting relation on an infeed conveyor comprising: (i) a rotatable lifting means adapted to receive said boards from said infeed conveyor, said rotatable lifting means including at least one arcuate camming element adapted to individually lift said boards at uniform intervals to a raised position by slidingly rotating beneath said boards; (ii) an outfeed conveyor for receiving said boards from said rotatable lifting system; and (iii) a rotatable advancing means located above said rotatable lifting means adapted to frictionally engage said boards when said boards are in said raised position and advance said boards onto said outfeed conveyor.

3 Claims, 4 Drawing Sheets

METHOD AND APPARATUS FOR SINGULATING LUMBER

FIELD OF THE INVENTION

This invention relates to a method and apparatus for singulating boards of dimensioned lumber. The invention has particular application in a sawmill or a planer mill for loading boards of dimensioned lumber onto a lugged transfer deck.

BACKGROUND OF THE INVENTION

In a modern sawmill operation, lumber is sawn into cants that have flat horizontal top and bottom surfaces and rough longitudinal side surfaces. The cants are processed through an edger to break them into boards of dimensioned lumber. Conventionally, the rough sawn boards are 1 or 2 inches thick, 2, 4, 6, 8, 10 or 12 inches wide and up to 20 feet long. From the edger, the boards are transferred onto an inclined transfer deck referred to as an unscrambler. As the boards advance along the unscrambler, they fall into a single tier of transversely oriented parallel boards with the longitudinal side surfaces of adjacent boards contacting each other. Typically, boards of varying thicknesses, widths and lengths are mixed together as they are processed through the mill. Within the mixture, there are commonly a significant number of boards that are twisted, warped, curved or otherwise irregularly shaped.

The next step in the milling process is to optical scan the boards. An optical scanner collects measurement data from each board passing through it and relays that information to a computer to create a morphological profile for use in further processing. Once the boards have been scanned, they are cut to length, and then sorted according to their dimensions.

The optical scanner can only take readings from a board which is spaced from adjacent boards. Accordingly, the boards advancing from the unscrambler must be singulated before passing through the scanner. Even if the boards are not optically scanned, they must be singulated before they are cut to length at the saw box. The most common method of singulating boards is to load them individually onto a lugged chain transfer with one board being placed between each pair of adjacent spaced lugs.

A number of devices that function to load lumber boards onto a lugged chain transfer are known. These devices, commonly referred to by those skilled in the art as either lug loaders or singulators, generally transfer the boards from an infeed transfer deck, on which the boards are positioned in parallel contacting relation, to an outfeed transfer deck, on which the boards are positioned in parallel spaced relation, for subsequent transfer onto a lugged chain transfer.

A number of singulators are known. In the apparatus disclosed in U.S. Pat. No. 3,031,061 issued to Rambo et al. on Apr. 24, 1962, lumber is fed from a driven conveyor belt onto a cam wheel having two cam segments with curved cam surfaces. Rotation of the cam wheel pushes the leading piece of lumber over a stationary stop and the pushing or pressing of the following pieces of lumber, together with the forward movement of the cam, causes the lumber to advance in a spaced manner according to the circumferential distance between the cam segments on the cam wheel. The singulator disclosed by Rambo et al. is not suitable for current sawmill or planer mill operations because it can only operate at low speeds. In addition, it cannot accommodate twisted, warped or curved pieces of lumber.

In U.S. Pat. No. 5,813,512 (Andersson) issued Sep. 29, 1998, a singulator having discs with cam surfaces is disclosed. Pieces of lumber are fed towards the discs on an infeed conveyor. The cam surfaces grippingly engage the leading piece of lumber and together with an upper feeder belt, lift and carry the piece of lumber forward onto an outfeed conveyor. The cam surfaces may have teeth to assist in gripping the underside of the lumber. The speed at which this singulator can operate is limited by the fact that each piece of lumber must be gripped by a cam surface. If the operating speed of the singulator is increased to the desired rate, it has a tendency to double load by depositing two pieces of lumber onto a single lug. Double loading substantially reduces the efficiency of the singulating operation because if more than one piece of lumber is placed between lugs, the optical scanner, unable to scan the pieces, transmits a "reject" signal to the sorter and the piece must be re-fed through the mill or planer. Increasing the speed also has a tendency to cause the gripping surface of the cam wheel to slide across the bottom surface of the lumber instead of engaging it. This not only results in a failure to advance the lumber piece onto the outfeed conveyor but also damages the bottom surfaces of the pieces.

A further drawback of the singulator disclosed in the '512 patent is that it can only accommodate thickness variations of up to ¼ inch without having to adjust the spacing between the cam surfaces and the feeder belts which operate above them. Moreover, the singulator does not adequately accommodate pieces of lumber that are twisted, bowed, warped or otherwise irregularly shaped because such pieces do not properly contact the cam surfaces and are consequently improperly gripped by them. This skipped loading affects the fill rate of the singulator, and as the speed of the singulator is increased, the fill rate drops.

Another singulator is disclosed in U.S. Pat. No. 5,921,376 (Michell et al.) issued Jul. 13, 1999. This singulator has a disc with heel and hook assemblies radially spaced thereon. The assemblies grasp the pieces of lumber along their lengths and individually transfer the pieces from the infeed transfer chain to the outfeed transfer chain. Because each piece of lumber is individually grasped by a heel and hook assembly, this singulator cannot attain the desired operating speed. In addition, it has a large number of moving parts which tends to result in increased maintenance requirements. Moreover, the heel and hook assemblies do not sufficiently accommodate pieces of lumber of different dimensions or pieces which are twisted, bowed, warped or otherwise irregular. Another drawback of this singulator is that engaging the lumber in the manner of the heel and hook assemblies tends to make marks on the lumber. These marks cause the end products to be downgraded which, in turn, results in decreased revenues for the mill operator.

Thus, there is a need for a singulator that can operate at high speed yet maintain a high fill rate and not double load or damage the lumber. In addition, there is a need for such a singulator to be able to accommodate lumber of widely varying dimensions and lumber that is twisted, bowed, warped or otherwise irregular.

SUMMARY OF THE INVENTION

The singulator of the present invention separates dimensioned lumber boards transversely disposed in parallel contacting relation on an infeed transfer deck by loading them individually onto a lugged chain transfer. The infeed transfer deck advances the contacting boards towards holding means disposed between the infeed transfer deck and an outfeed transfer deck. Rotors having one or more cam elements and being rotatable about a transverse axis are disposed beneath the holding means. The infeed transfer deck conveys the parallel contacting boards to the holding means which act to prevent the further advancement of the parallel contacting boards by retaining the leading board. As the rotors rotate beneath the leading board, a cam element on each rotor slides against its bottom surface such that the board is lifted into contact with upper rolls pivotally mounted above the rotors and rotatable about a transverse axis. The rolls frictionally engage the upper surface of the lifted board and bias it against lower rollers disposed downstream of the holding means such that the board is pinched between the rolls and the rollers. The rotation of the rolls advance the board onto the outfeed transfer deck for subsequent loading onto the lugged chain transfer while the remainder of the boards remain upstream of the holding means and retained thereby.

A pivotally mounted pressure shoe disposed above the infeed transfer deck reduces double loading of boards onto the outfeed transfer deck. It biases the board following the leading board downwards against the infeed transfer deck to prevent it from rising on a cam element together with the leading board.

Because both the pressure shoe and the upper roll are pivotably mounted, boards of varying thicknesses can be accommodated without the need for adjustment.

As the rotor functions to simply lift the boards into contact with the rotating upper roll by sliding along the bottom surface of the boards, the rotor can operate at high speeds without damaging the boards and boards which are bent, twisted or warped are accommodated.

Thus in accordance with the present invention, there is provided an apparatus for spacing boards of lumber in transverse parallel contacting relation on an infeed conveyor comprising: a rotatable lifting means adapted to receive said boards from said infeed conveyor, said rotatable lifting means including at least one arcuate camming element adapted to individually lift said boards at uniform intervals to a raised position by slidingly rotating beneath said boards; an outfeed conveyor for receiving said boards from said rotatable lifting system; and a rotatable advancing means located above said rotatable lifting means adapted to frictionally engage said boards when said boards are in said raised position and advance said boards onto said outfeed conveyor.

DETAILED DESCRIPTION OF THE PREFERRED EMBODIMENT

Figure 1:
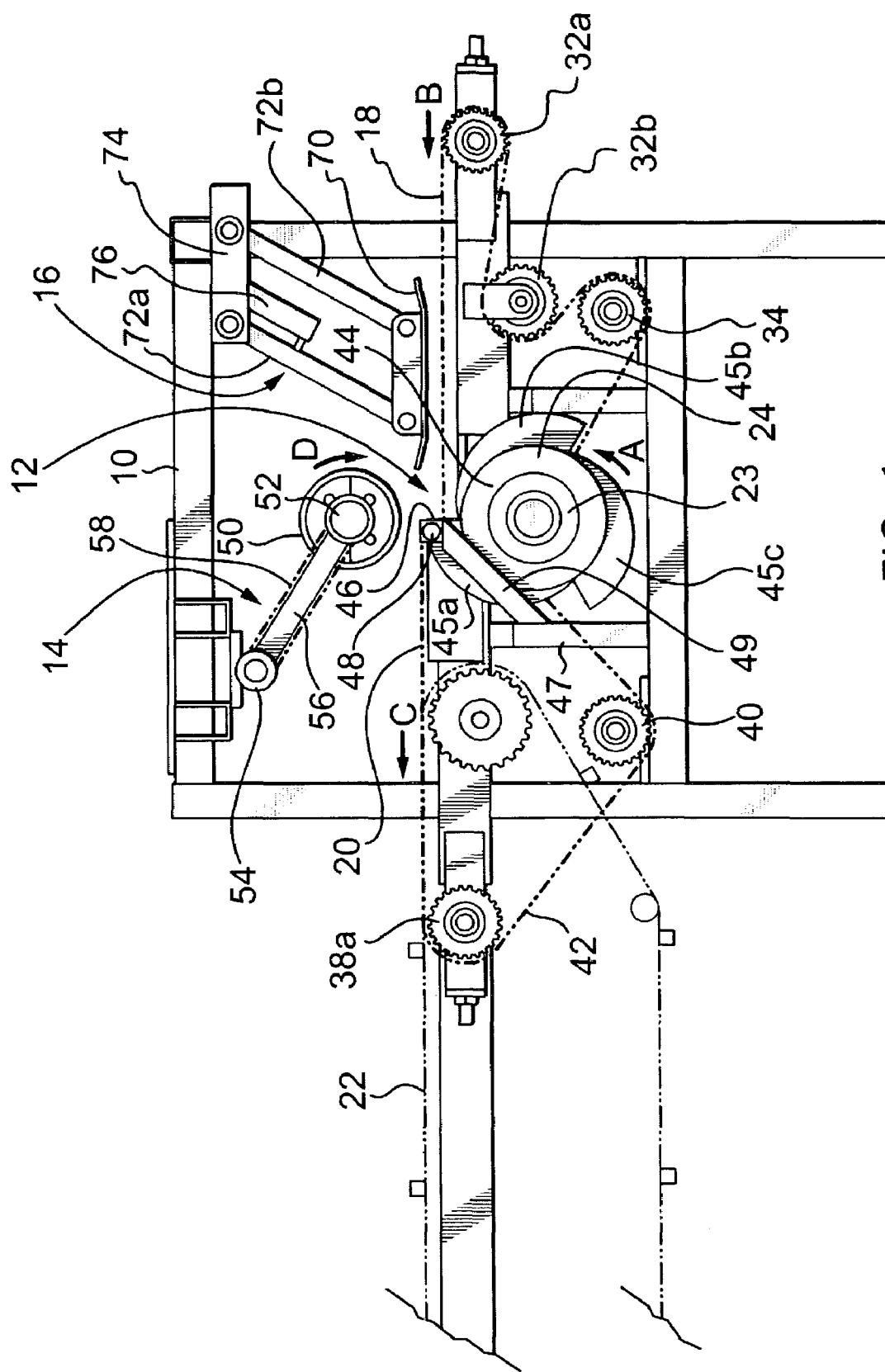
FIG. 1 is a transverse sectional view of the singulator of the present invention, the infeed chain transfer, the outfeed chain transfer and the lugged chain transfer.
Figure 2:
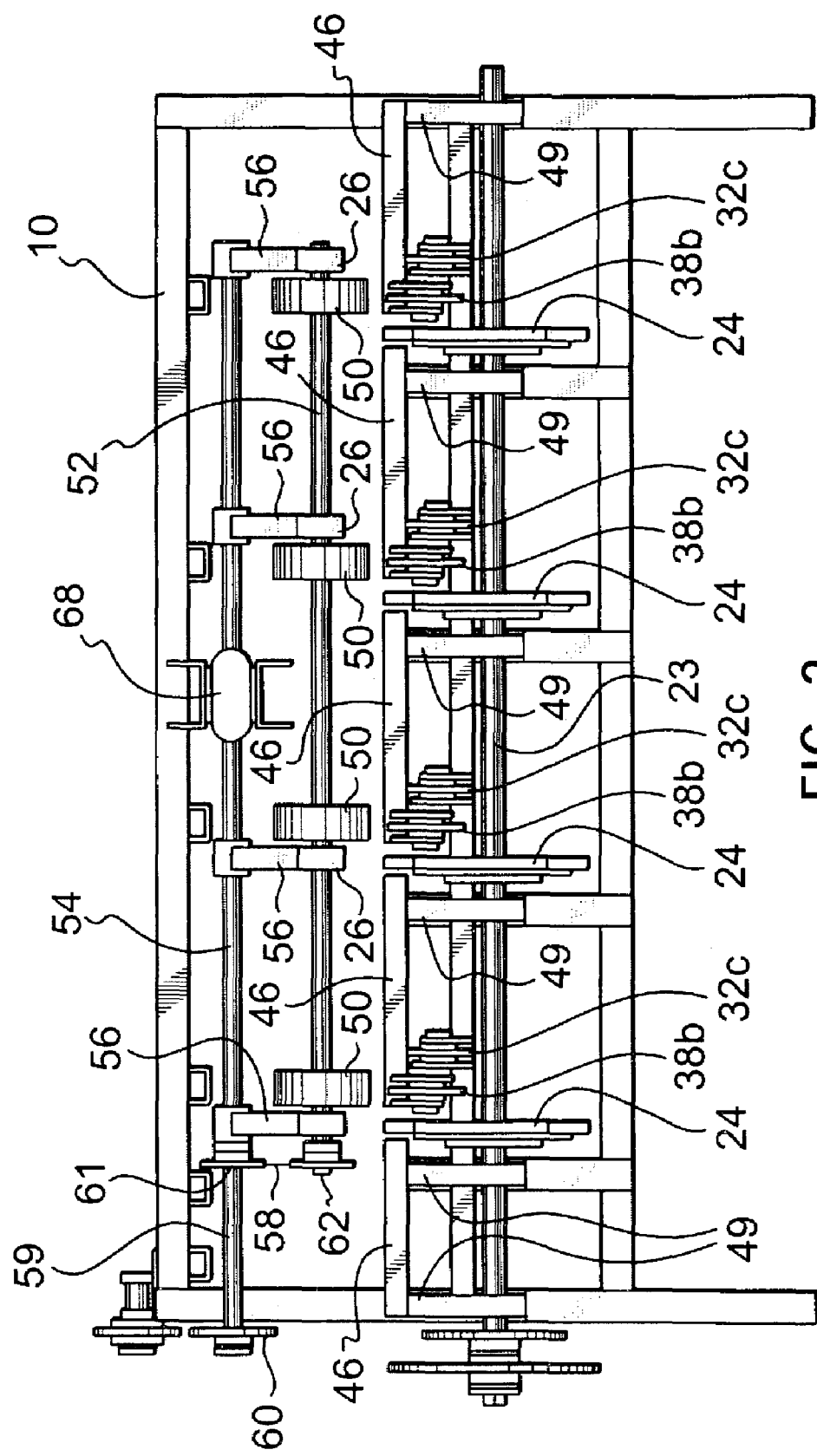
FIG. 2 is a longitudinal sectional view of the singulator of the present invention.
Figure 3:
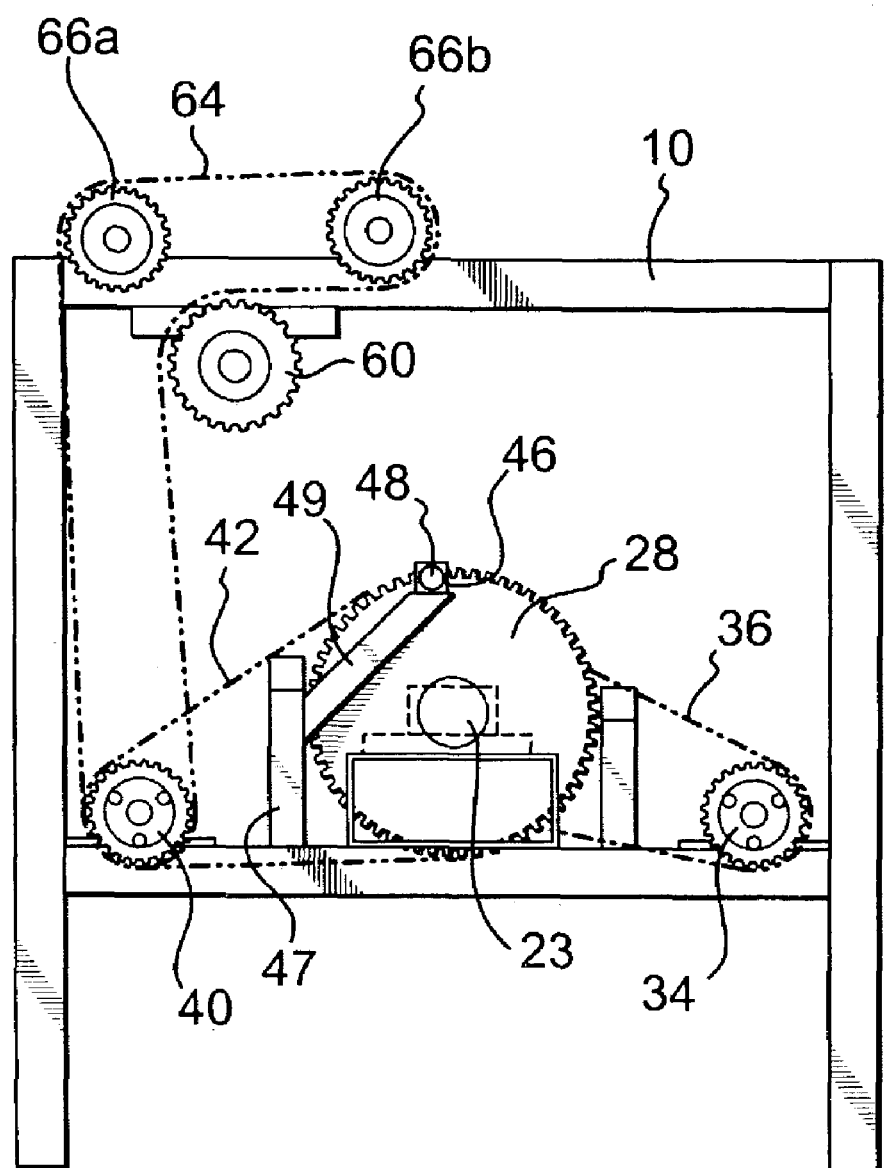
FIG. 3 is a side elevational view of the singulator of the present invention.

With reference to FIGS. 1, 2 and 3, the apparatus of the present invention is comprised of one or more singulating units, the components of which are supported by support frame 10. Each of said units includes a cammed rotor assembly 12, a pressure roll assembly 14 and a pressure shoe assembly 16. The apparatus is comprised of any suitable number of said units depending on the length of the boards to be singulated. In the embodiment illustrated in FIG. 2, four units are uniformly spaced across support frame 10 at 24 inches on centre. This particular configuration is suitable for boards up to 8 feet in length.

A singulating unit is positioned between infeed chain transfer 18 and outfeed chain transfer 20. Lugged chain transfer 22 is positioned downstream of outfeed chain transfer 20. A power source (not shown) drives lugged chain transfer 22 which, in turn, rotates drive shaft 23 and drive sprocket 28 via in counterclockwise direction as shown by arrow A in FIG. 1. Infeed chain transfer 18 is continuous about idler sprockets 32a, 32b and 32c and is driven by infeed chain transfer sprocket 34 which, in turn, is driven by drive sprocket 28 via infeed drive chain 36. The upper course of infeed chain transfer 18 moves in the direction shown by arrow B in FIG. 1. Outfeed chain transfer 20 is continuous about idler sprocket 38a and 38b and is driven by outfeed chain transfer sprocket 40 which, in turn, is driven by drive sprocket 28 via outfeed drive chain 42. The upper course of outfeed chain transfer 20 moves in the direction shown by arrow C in FIG. 1.

With reference to FIG. 1, cammed rotor assembly 12 is positioned between infeed chain transfer 18 and outfeed chain transfer 20. Cammed rotor 24 is mounted on drive shaft 23, which defines a transverse axis about which cammed rotor 24 is rotatable, and is comprised of disc 44 and uniformly radially spaced cam elements 45a, b, c extending from the periphery thereof. Although three cam elements are shown in the drawings, any suitable number of cam elements may be used, depending on the amount of spacing desired between boards and the diameter of the disc used. Cam elements 45a,b,c each have an arcuate surface extending gradually outwards from the periphery of disc 44 and a straight edge aligned with a radial axis of disc 44. Cam elements 45a,b,c are connected to disc 44 by bolts or other suitable fastening means, preferably in a manner such that the height of the cam element can be adjusted by pivoting the higher end about a fixed lower end. Cam elements 45a, b, c may be manufactured from plastic, metal or any other suitable material.

With reference to FIGS. 1 and 2, fence 46, also referred to as vertical holding means, is a longitudinal member of L-shaped cross-section mounted on support legs 47, 49 on each side of cammed rotor 24. Fence 46 is positioned such that when the straight edge of any one of cammed elements 45a, b, c is at its highest point of rotation, said straight edge is aligned with fence 46, and cam element 45 extends marginally above the top of fence 46.

Rotary cam assembly 12 also includes roller 48 as illustrated in FIGS. 1 and 3. Roller 48 is disposed adjacent to and on the downstream side of fence 46. Roller 48 is mounted on a shaft (not shown) which is rotatably connected to the ends of fence 46. The top of roller 48 extends marginally above fence 46 and is generally level with the top of cammed element 45a,b,c when its straight edge is at its highest point of rotation.

Pressure roll assembly 14 is mounted on the upper portion of support frame 10 and is disposed above rotary cam assembly 12. Pressure roll assembly 14 acts as a rotatable advancing means. Pressure roll 50 is mounted on lower roll shaft 52. Lower roll shaft 52 is pivotally connected to upper roll shaft 54 by pivot arm 56. Roll shaft drive chain 64 is continuous around roll idler sprockets 66a, 66b and upper roll drive shaft sprocket 60, and is driven by outfeed chain transfer drive sprocket 40 causing upper roll drive shaft 59, upper roll drive shaft sprocket 60 and upper roll shaft sprocket 61 to rotate. Roll drive chain 58 is continuous about upper roll shaft sprocket 61 and lower roll shaft sprocket 62. Thus, upper roll shaft sprocket 61 drives lower roll shaft 52 via roll drive chain 58 and lower roll shaft sprocket 62. The rotation of lower roll shaft 52 causes pressure roll 50 to rotate in a clockwise direction as indicated by arrow D in FIG. 1.

Because lower roll shaft 52 is pivotally connected to upper roll shaft 54, pressure roll is vertically displaceable above rotary cam assembly 12. Air spring 68 mounted on upper roll shaft 54 maintains the application of downward pressure of pressure roll 50 by applying torque to upper roll shaft 54. The number of air springs used depends on a number of factors including the strength of the springs, the length of the upper roll shaft and the number of pressure rolls. Coil springs and other suitable means for applying downward pressure to pressure roll may also be used.

Pressure shoe assembly 16 is mounted on the upper portion of support frame 10 and is disposed above the upper course of infeed chain transfer 18. Pressure shoe assembly includes shoe plate 70 pivotally mounted on shoe arms 72a, 72b. Shoe arms 72a and 72b are pivotally mounted on shoe brace 74. Shoe plate 70 has a flat horizontal central pressing surface and upwardly angled front and rear surfaces. Shoe plate 70 is displaceable in a vertical plane while maintaining its horizontal disposition. A spring mechanism 76 is connected to shoe arm 72a to maintain the application of downward pressure of shoe plate 70.

The speeds of the chain transfers and the rotor are synchronized according to the particular size and configuration of the components used and the spacing required between the boards. In a preferred embodiment, the speed of the infeed chain transfer speed is on a 2:1 ratio with the rotor shaft speed and the speed of the outfeed chain transfer is on a 3:1 ratio with the rotor shaft speed. The speed of one lug is matched 1:1 with the speed of an individual cam element.

The upper course of infeed chain transfer 18 is positioned below the upper course of outfeed chain transfer 20. In the preferred embodiment, the difference in height between infeed chain transfer 18 and outfeed chain transfer 20 is approximately 1¾ inches. The top of fence 46 is positioned marginally above the upper course of outfeed chain transfer 20. In the preferred embodiment, the top of fence 46 is ¾ inch above upper course of outfeed chain transfer 20.

Figure 4:
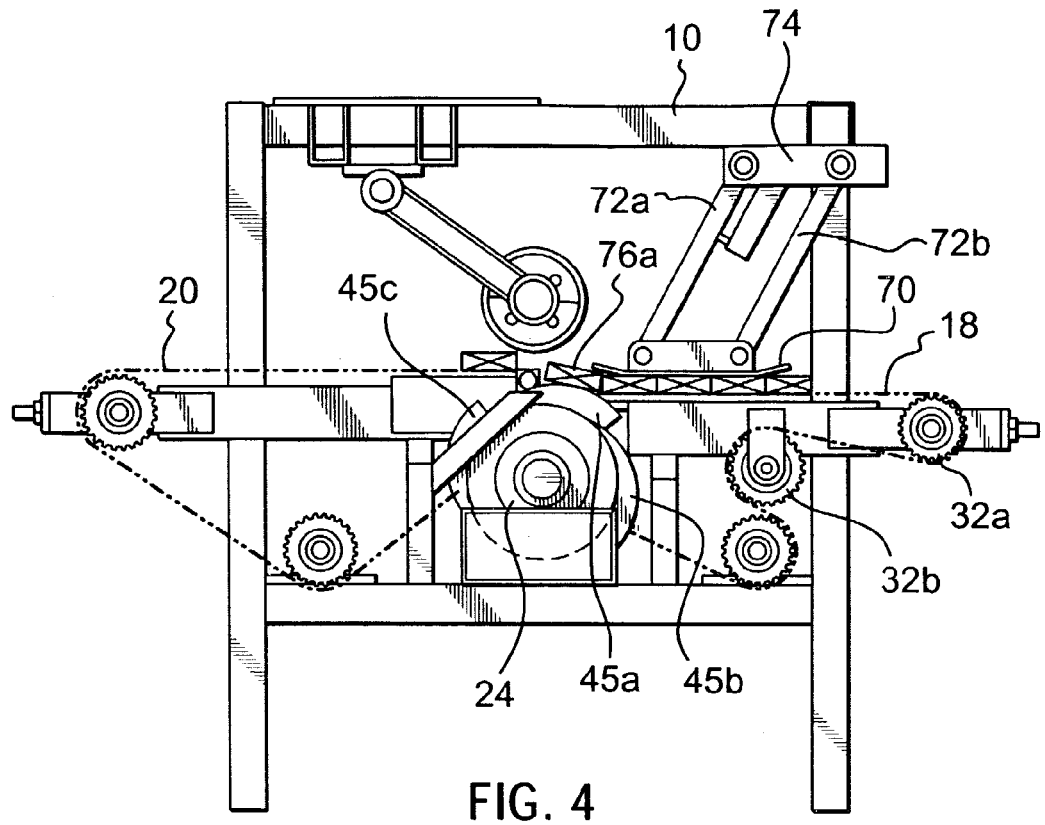
FIG. 4 is a transverse sectional view of the singulator of the present invention illustrating the lumber boards advancing towards the singulator and the leading piece of lumber being held by the fence and raised by a cam element.
Figure 5:
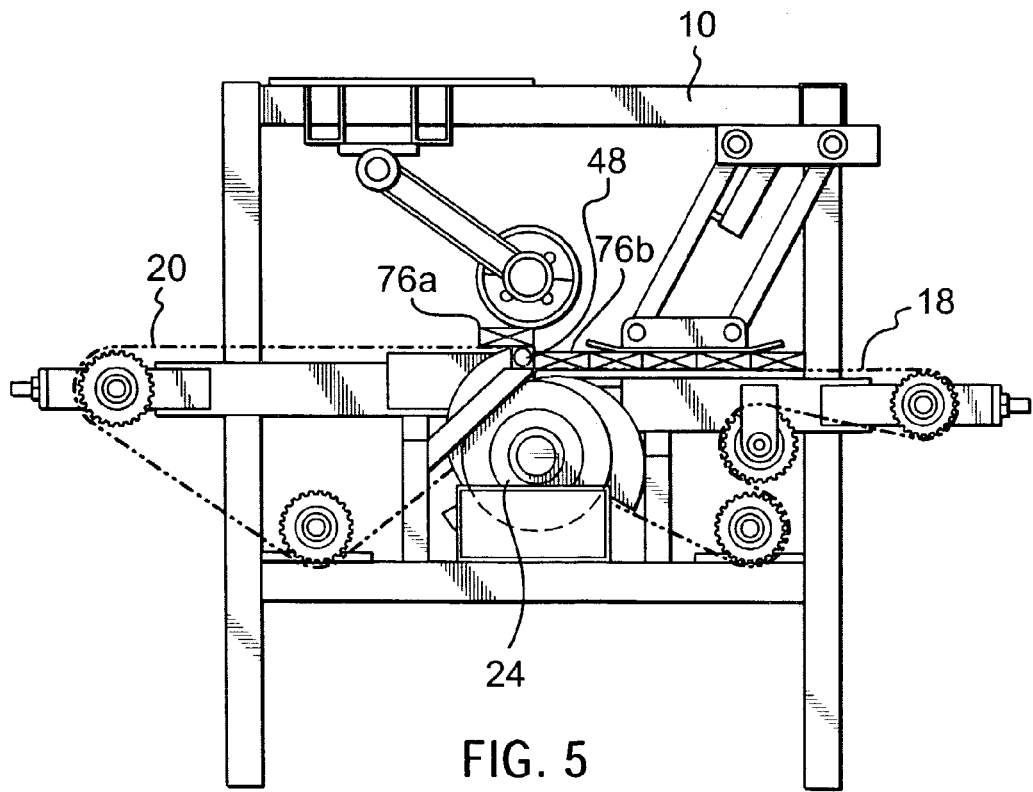
FIG. 5 is a transverse sectional view of the singulator of the present invention illustrating the lumber boards advancing towards the singulator and the leading piece of lumber advancing over the fence onto the outfeed chain transfer.

The operation of the singulator will be described with reference to FIGS. 4 and 5. Although the operation is described with reference to a single singulating unit, it is to be understood that a series of singulating units transversely disposed across the apparatus operate simultaneously on a board.

Boards 76a,b,c and d are conveyed on infeed chain transfer 18 in a single tier in parallel contacting relation towards rotary cam assembly 12. As illustrated in FIG. 4, leading board 76a abuts fence 46 which arrests the advancement of board 76a as well as all parallel contacting boards following board 76a. While boards 76 are retained by fence 46, cammed rotor 24 rotates in a counterclockwise direction and cam element 45a slides under the bottom surface of board 76a. As cammed rotor 24 rotates, the arcuate surface of cam element 45a tilts board 76a upwards and lifts it in relation to fence 46. As the highest part of cam element 45a passes beneath board 76a, the leading edge of board 76a is raised above the top of fence 46 and the top surface of board 76a comes into contact with rotating pressure roll 50. Pressure roll 50 biases board 76a against roller 48 and engages the upper surface of leading board 76a with sufficient friction to advance the board between roll 50 and roller 48 and onto outfeed chain transfer 20.

As cammed rotor 24 rotates, board 76b may, depending on the width of board 76a in relation to the length of the arcuate surface of cam element 45a, start to rise on cam element 45a behind board 76a. However, pressure shoe assembly 16 is downwardly biased against boards 76b, c and d and as soon as the straight edge of cam element 45a slides under the leading edge of board 76b, the downward pressure exerted by shoe plate 70 knocks board 76b down onto cam element 45b. The action of shoe plate 70 on board 76b ensures that it does not follow board 76a over the fence thus avoiding double loading of boards 76a and 76b onto outfeed chain transfer 20. Board 76b is then tilted and raised over fence 46 by cam element 45b.

As boards 76 are individually advanced over fence 46, they are loaded onto outfeed chain transfer in a uniformly spaced manner. Boards 76 are conveyed along outfeed chain transfer 20 and then transferred onto lugged chain transfer 22 for optical scanning. The speed of lugged chain transfer 22 is synchronized with the speed of outfeed chain transfer 20 and cammed rotor 24 so that one board is loaded between adjacent spaced lugs.

The singulator of the present invention operates in a highly effective manner. In particular, it can achieve speeds of at least 300 lugs per minute with no double loading and a 100% fill rate. The cammed rotor slidingly rotates beneath the boards and the cammed elements act only to raise the boards to a height to enable the pressure rolls to advance the leading board over the fence. As a result, the cammed rotor can operate at high speeds without risk of damaging the lumber or failing to effectively lift the boards. In addition, the pressure rolls provide a continuous surface to frictionally engage the boards and thus immediately advance any board with which it is brought into contact. As a result of the combined operation of the cammed rotor and the pressure roll, speed at which the boards are loaded onto the lugged chain transfer is generally limited by other components of the milling process.

The singulator operates at a high fill rate, even at high speeds. This is because, regardless of the fact that a board may be bowed, warped, twisted or otherwise irregular, the rotary cams will lift it into contact with the pressure rolls. Also, as the pressure rolls are each vertically displaceable, they can accommodate irregularities in the configuration of the board on an individual basis and continue to frictionally engage it in order to advance it onto the outfeed chain transfer.

The singulator of the present invention, and in particular, the operation of the pressure shoe assembly in combination with the configuration of the cammed elements also significantly reduces or eliminates the incidence of double loading.

Further advantageously, the singulator of the present invention can accommodate a mixture of boards of significantly varying widths, lengths and thicknesses. The singulator can accommodate boards of varying thickness because both the roll assembly and the shoe assembly are vertically displaceable. For instance, the embodiment of the apparatus illustrated in the drawings can accommodate boards having a thickness ranging from ¾ inch to 3 inches, widths ranging from 2 inches to 14 inches and lengths up to 8 feet long. Modifications can be made to the apparatus to accommodate greater and/or different ranges. For example, to accommodate boards of length greater than 8 feet, the apparatus would simply incorporate more singulating units similarly spaced across the support frame. The ability to accommodate such variation in board thickness, width and length is highly advantageous because it avoids the necessity to make adjustments to the apparatus during the lug loading operation.

The present invention has been shown and described with reference to preferred embodiments of the invention. It is to be understood that departures may be made therefrom within the spirit and scope of the invention.

We claim:

1. An apparatus for spacing boards of lumber in transverse parallel contacting relation on an infeed conveyor comprising:
   (i) a rotatable lifting means adapted to receive said boards from said infeed conveyor, said rotatable lifting means being comprised of a plurality of spaced rotors each having at least one arcuate camming element and rotatable about a first transverse axis beneath said boards for slidingly engaging the underside of said boards, without gripping engagement thereof, to individually lift said boards at uniform intervals to a raised position;
   (ii) an outfeed conveyor for receiving said boards from said rotatable lifting system;
   (iii) a rotatable advancing means located above said rotatable lifting means adapted to frictionally engage said boards when said boards are in said raised position and advance said boards onto said outfeed conveyor, wherein said rotatable advancing means is comprised of a plurality of rolls rotatable about a second transverse axis; and
   (iv) at least one roller against which said plurality of rolls biases said boards, wherein said boards advance between said rolls and said at least one roller onto said outfeed conveyor.

2. The apparatus of claim 1 further including a holding means to prevent the advancement of said boards when in sliding engagement with said at least one arcuate camming element.

3. An apparatus for spacing boards of lumber in transverse parallel contacting relation on an infeed conveyor comprising:
   (i) a rotatable lifting means adapted to receive said boards from said infeed conveyor, said rotatable lifting means including at least one arcuate camming element for rotating beneath said boards and slidingly engaging the underside of said boards, without gripping engagement thereof, to individually lift said boards at uniform intervals to a raised position;
   (ii) an outfeed conveyor for receiving said boards from said rotatable lifting system;
   (iii) a rotatable advancing means located above said rotatable lifting means adapted to frictionally engage said boards when said boards are in said raised position and advance said boards onto said outfeed conveyor; and
   (iv) a pressure shoe for biasing said boards against said infeed conveyor to prevent boards adjacent to a first board in said raised position from lifting to said raised position in contacting relation with said first board.

* * * * *